United States Patent
Cheong et al.

(10) Patent No.: US 9,990,091 B2
(45) Date of Patent: Jun. 5, 2018

(54) METHOD AND APPARATUS FOR BLOCKING ACCUMULATION OF ELECTRICAL FAST TRANSIENT (EFT) NOISE

(71) Applicant: STMicroelectronics Asia Pacific Pte Ltd, Singapore (SG)

(72) Inventors: Chee Weng Cheong, Singapore (SG); EngJye Ng, Singapore (SG); Dianbo Guo, Singapore (SG); Chaochao Zhang, Singapore (SG); Kusuma Adi Ningrat, Seoul (KR)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 79 days.

(21) Appl. No.: 14/753,129

(22) Filed: Jun. 29, 2015

(65) Prior Publication Data

US 2016/0378222 A1 Dec. 29, 2016

(51) Int. Cl.
*G06F 3/045* (2006.01)
*G06F 3/044* (2006.01)

(52) U.S. Cl.
CPC .................. *G06F 3/044* (2013.01)

(58) Field of Classification Search
CPC ....................................... G06F 3/044
USPC ......................................................... 345/174
See application file for complete search history.

(56) References Cited

U.S. PATENT DOCUMENTS

| | | | |
|---|---|---|---|
| 8,020,049 B2 | 9/2011 | Asuncion et al. | |
| 8,040,142 B1* | 10/2011 | Bokma | H03K 17/955 324/658 |
| 2014/0098032 A1* | 4/2014 | Ng | G06F 3/0418 345/173 |

* cited by examiner

*Primary Examiner* — Mark Regn
(74) *Attorney, Agent, or Firm* — Crowe & Dunlevy

(57) ABSTRACT

A charge sensing circuit generates a voltage in a sensing period that is indicative of sensed charge. The generated voltages are accumulated by an accumulator circuit over a number of sensing periods. A noise detection circuit senses when the voltage generated by the charge sensing circuit is outside of a boundary and generates a detection signal in response thereto. A control circuit, in response to the detection signal, controls the accumulator circuit to block accumulation of the voltages generated by the charge sensing circuit during at least the sensing period in which the detection signal is generated. An analog-to-digital converter circuit then converts an accumulated output voltage from the accumulator circuit to a digital value at the end of an accumulation time period that includes the sensing periods. The end of the accumulation time period is delayed by at least one sensing period in response to the detection signal.

26 Claims, 4 Drawing Sheets

METHOD AND APPARATUS FOR BLOCKING ACCUMULATION OF ELECTRICAL FAST TRANSIENT (EFT) NOISE

TECHNICAL FIELD

The present invention relates to noise, in particular electrical fast transient (EFT) noise, and a technique for blocking the accumulation of such noise when processing a desired signal.

BACKGROUND

Reference is now made to FIG. 1 showing a block diagram of a touch panel sensing system 10. The system 10 includes a touch panel 12 formed of a plurality of intersecting conductive lines. The lines include a first set of parallel conductive lines 14 oriented to extend in a first direction and a second set of parallel conductive lines 16 oriented to extend in a second direction. In this implementation, the first and second directions are perpendicular to each other. The first and second lines are separated from each other by a thin insulating dielectric layer.

The system 10 further includes a control circuit 20. The control circuit 20 includes a digital processing circuit 22. The processing circuit 22 is configured to operate for the generation of AC drive signals (for example, a digital waveform) that is applied through a transmit (Tx) drive circuit 24 to the first set of lines 14 (which are referred to by those skilled in the art in this context as "force" lines). The drive signals are capacitively coupled to the second set of lines 16 (which are referred to by those skilled in the art in this context as "sense" lines) at each location wherein one of the lines 14 and one of the lines 16 intersect (pass over) each other. The control circuit 20 further includes one or more sensing circuits 26 coupled to the lines 16. The sensing circuit 26 functions as a charge-to-voltage (C2V) converter circuit operating, as is well known in the art, to convert the capacitance at the intersection of lines 14 and 16 to a voltage (the operation referenced to a common mode voltage Vcm). In operation of the touch panel sensing system 10, that line intersection capacitance is modulated by a proximately located object (such as, for example, the finger of a human being or a stylus), and thus the voltage generated at the output of the sensing circuit 26 will be indicative of the proximity of the object. The control circuit 20 further includes an analog accumulator circuit 28 that functions to accumulate over an accumulation time period the voltages output from the sensing circuit 26. At the end of the accumulation time period, an analog-to-digital converter (ADC) circuit 30 converts the accumulated voltage to a digital signal that is processed by the digital processing circuit 22 to extract information relating to the proximately detected object (such as, for example, a touch or hover location, a touch strength, etc.).

FIG. 2 illustrates operation of the system 10. The AC drive signal (Tx) in the form of a square wave signal is applied to a given one of the force lines 14 using the drive circuit 24. The sensing circuit 26 coupled to one of the sense lines 16 generates an output signal (C2V Out) dependent on the capacitance at the sensing location where the force line 14 and sense line 16 intersect. At the beginning of a sensing period S, the C2V Out signal is reset (reference 32) to the common mode voltage Vcm. Each accumulation time period includes a plurality of those sensing periods S, wherein each sensing period is associated with a given phase of the AC drive signal. The sensing circuit 26 then integrates (reference 34) charge to generate a voltage (reference 36) that is indicative of the charge at the sensing location. At the end of the sensing period S, the analog accumulator circuit 28 accumulates (reference 38) the voltage 36. Thus, the analog accumulator circuit 28 functions to sum the voltage 36 magnitudes for each sensing period S included within the accumulation time period. At the end of the accumulation time period, the accumulator output voltage is converted from the analog domain to the digital domain by the ADC circuit 30 for processing by the digital processing circuit 22.

Those skilled in the art recognize concerns with the noise phenomena known as electrical fast transient (EFT). This type of noise may generally be characterized having a high amplitude and a single frequency. Such noise can be present in a system 10 where it generates excessive charge coupled to the touch panel 12. Reference is made to FIG. 3 which illustrates operation of the system 10 with the EFT noise event indicated at reference 40. Because the sensing circuit 26 coupled to the sense lines 16 is a charge-to-voltage (C2V) converter circuit, the induced excessive charge of the EFT noise event will introduce an error (reference 42) in the C2V Out signal because that EFT-related charge is integrated (reference 44) by the sensing circuit 26. This error will then be accumulated by the analog accumulator circuit 28 (reference 46). This accumulated error offsets the accumulated value at the end of the accumulation time period (compare to FIG. 2) and introduces an error in the digital signal output by the ADC circuit 30

There is a need in the art to address concerns with errors introduced by electrical fast transient noise in the operation of capacitive touch panel sensing systems.

SUMMARY

In an embodiment, a circuit comprises: a charge sensing circuit configured to generate a voltage in a sensing period that is indicative of sensed charge; an accumulator circuit configured to accumulate the voltages over a plurality of said sensing periods; a noise detection circuit configured to sense when the voltage generated by the charge sensing circuit is outside of a boundary and generate a noise event detection signal in response thereto; and a control circuit configured to receive the noise event detection signal and control the accumulator circuit to block accumulation of the voltage generated by the charge sensing circuit during at least the sensing period in which the noise event detection signal is generated.

In an embodiment, a method comprises: generating a voltage in a sensing period that is indicative of sensed charge; accumulating the voltages over a plurality of said sensing periods; detecting when the generated voltage is outside of a boundary; generating a noise event detection signal in response to the detection; and controlling said accumulating in response to the noise event detection signal to block accumulation of the generated voltage during at least the sensing period in which the noise event detection signal is generated.

In an embodiment, an apparatus comprises: a touch panel including a force line and a sense line which intersect each other at an intersection capacitance, said touch panel susceptible to an electrical fast transient noise event; a charge sensing circuit coupled to the sense line and configured to generate a voltage in a sensing period that is indicative of sensed charge at the intersection capacitance; an accumulator circuit configured to accumulate the voltages over a plurality of said sensing periods; a noise detection circuit configured to sense the electrical fast transient noise event if the voltage generated by the charge sensing circuit is outside of a boundary and generate a noise event detection signal; and a control circuit responsive to the noise event detection signal and configured to control the accumulator circuit to block accumulation of the voltage generated by the charge sensing circuit during at least the sensing period in which the noise event detection signal is generated.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 4:
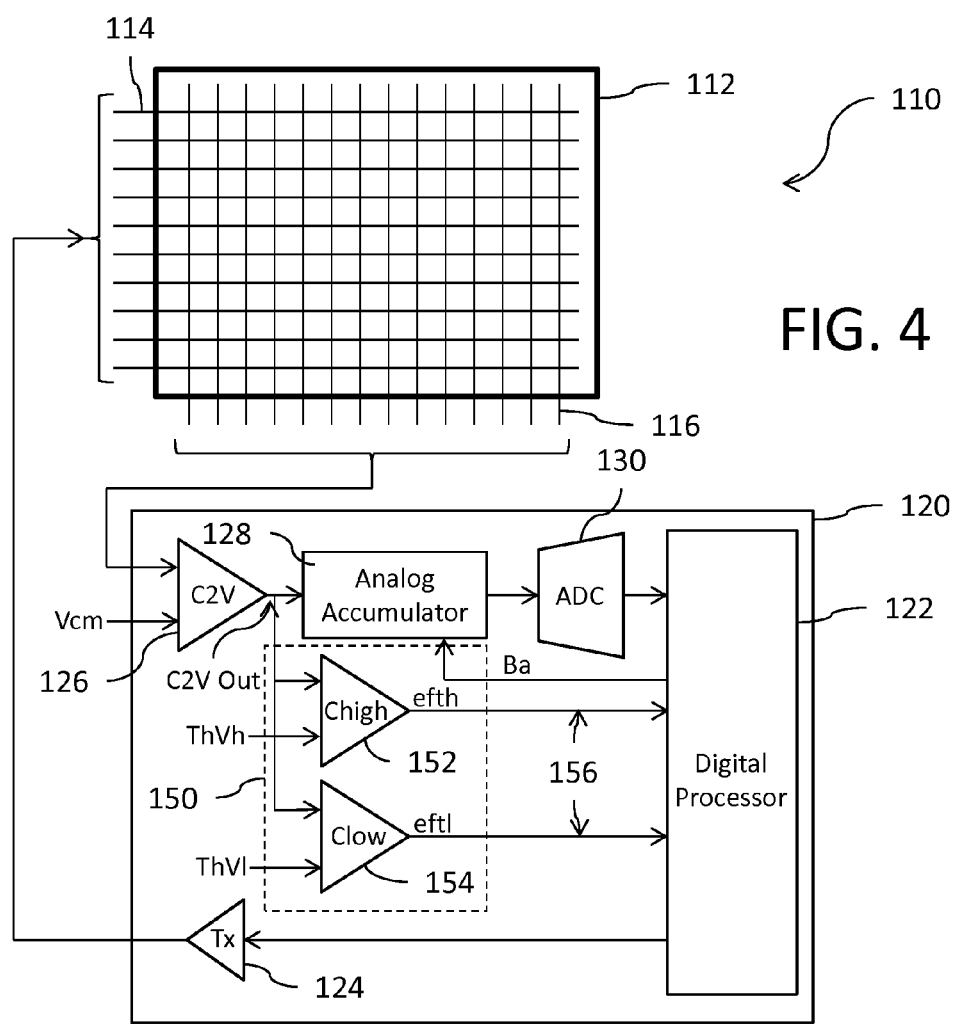
FIG. 4 is a block diagram of a touch panel sensing system including circuitry for blocking accumulation of electrical fast transient noise.

Reference is now made to FIG. 4 showing a block diagram of a touch panel sensing system 110 including circuitry for blocking accumulation of electrical fast transient noise. The system 110 includes a touch panel 112 formed of a plurality of intersecting conductive lines. The lines include a first set of parallel conductive lines 114 oriented to extend in a first direction and a second set of parallel conductive lines 116 oriented to extend in a second direction. In this implementation, the first and second directions are perpendicular to each other. The first and second lines are separated from each other by a thin insulating dielectric layer.

The system 110 further includes a control circuit 120. The control circuit 120 includes a digital processing circuit 122. The processing circuit 122 is configured to operate for the generation of AC drive signals (for example, a digital waveform) that is applied through a transmit (Tx) drive circuit 124 to the first set of lines 114 (which are referred to by those skilled in the art in this context as "force" lines). The drive signals are capacitively coupled to the second set of lines 116 (which are referred to by those skilled in the art in this context as "sense" lines) at each location wherein one of the lines 114 and one of the lines 116 intersect (pass over) each other. The control circuit 120 further includes one or more sensing circuits 126 coupled to the lines 116. The sensing circuit 126 functions as a charge-to-voltage (C2V) converter circuit operating, as is well known in the art, to convert the capacitance at the intersection of lines 114 and 116 to a voltage (the operation referenced to a common mode voltage Vcm). In operation of the touch panel sensing system 110, that line intersection capacitance is modulated by a proximately located object (such as, for example, the finger of a human being or a stylus), and thus the voltage generated at the output of the sensing circuit 126 will be indicative of the proximity of the object. The control circuit 120 further includes an analog accumulator circuit 128 that functions to accumulate over an accumulation time period the voltages output from the sensing circuit 126. At the end of the accumulation time period, an analog-to-digital converter (ADC) circuit 130 converts the accumulated voltage to a digital signal that is processed by the digital processing circuit 122 to extract information relating to the proximately detected object (such as, for example, a touch or hover location, a touch strength, etc.).

Figure 1:
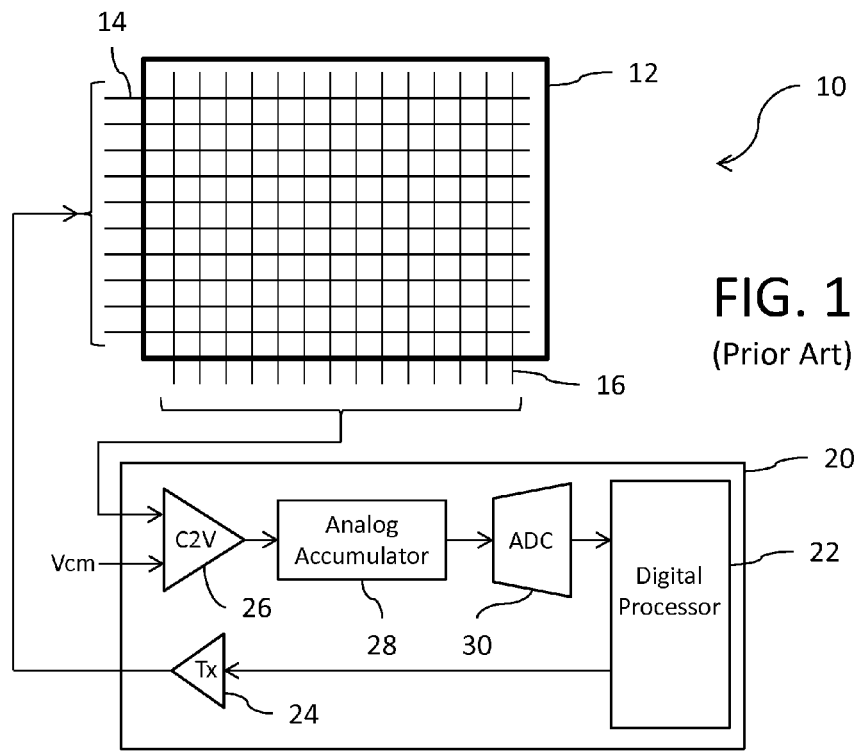
FIG. 1 is a block diagram of a touch panel sensing system.
Figure 2:
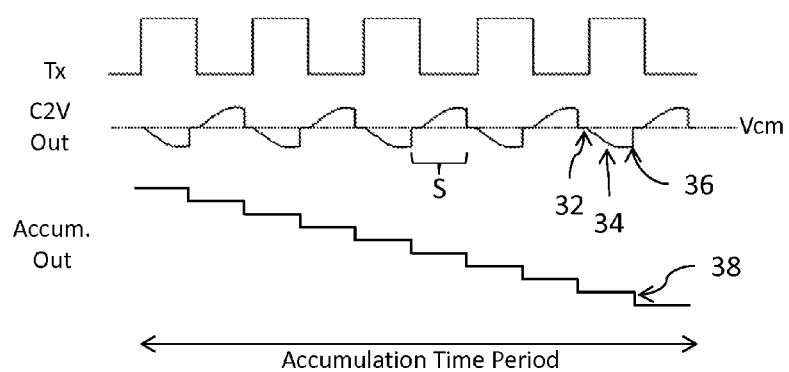
FIG. 2 illustrates operational waveforms for the system of FIG. 1.
Figure 3:
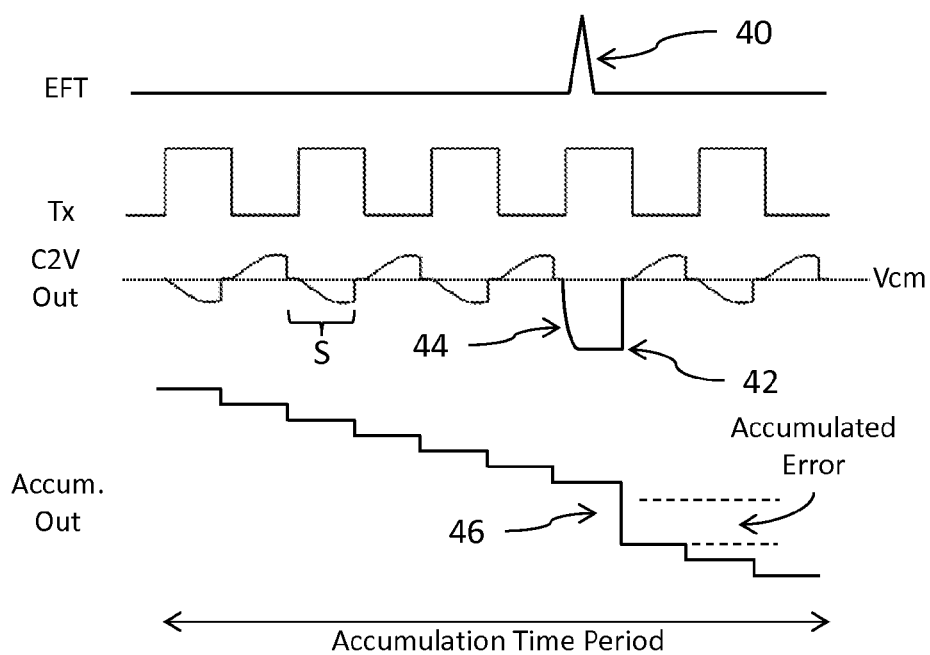
FIG. 3 illustrates operational waveforms for the system of FIG. 1 in the presence of an electrical fast transient.

As discussed above in connection with FIG. 3, an electrical fast transient (EFT) noise event 40 can introduce an accumulation error 46 in the accumulated output generated by the analog accumulator circuit 128. To address this issue, the control circuit 120 includes a detection circuit 150 that receives the C2V Out signal output from the sensing circuit 126 and operates to sense the error 42 induced by the excessive charge of the EFT noise event 40. In response to such a detection, the circuit 150 generates an EFT event detect signal 156 that is passed to the digital processing circuit 122. The digital processing circuit 122 responds to the EFT event detect signal 156 by asserting a block accumulation (Ba) control signal that is applied to the analog accumulator circuit 128. The analog accumulator circuit 128 responds to the Ba control signal by blocking accumulation of the C2V Out signal for a blocking time duration. The blocking time duration is of sufficient length to ensure: a) that the error 42 present within the C2V Out signal, as induced by the excessive charge of the EFT noise event 40, is not accumulated into the output accumulated voltage, and b) that the analog accumulator circuit 128 operation is synchronized with the proper phase of the AC drive signal when accumulation is resumed.

The detection circuit 150 includes a first comparator (Chigh) 152 that includes a first input configured to receive the C2V Out signal from the sensing circuit 126 and a second input configured to receive a high threshold voltage (ThVh). The first comparator 152 functions to compare the voltage of the C2V Out signal to the high threshold voltage and assert a high EFT event detect signal (efth) when the C2V Out signal is detected to be greater than the high threshold voltage. The digital processing circuit 122 responds by asserting the block accumulation (Ba) signal, and the analog accumulator circuit 128 responds thereto by blocking accumulation of that too high C2V Out signal voltage. Accumulation operations by the accumulator circuit 128 do not continue until the block accumulation (Ba) signal is deasserted by the digital processing circuit 122 following the expiration of the blocking time duration.

Figure 5:
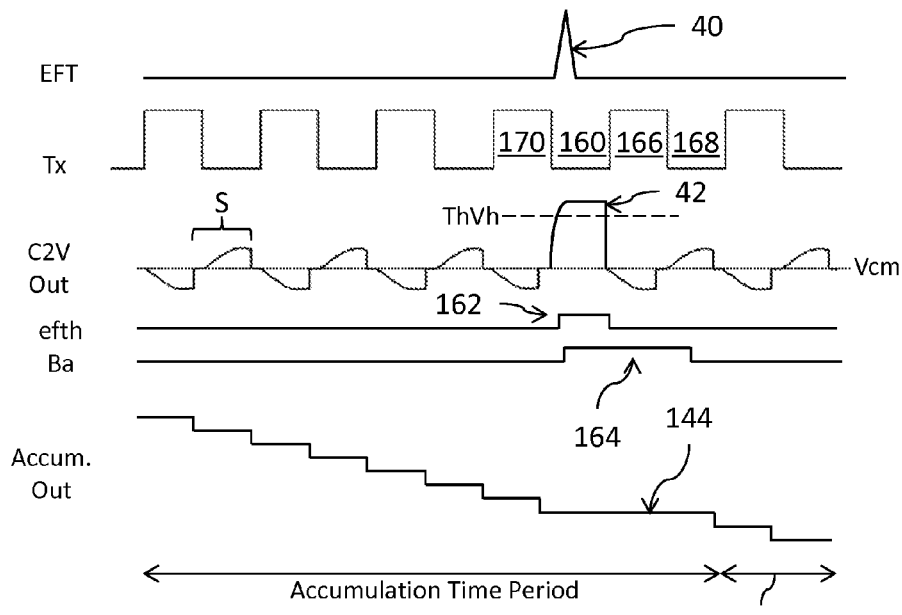
FIGS. 5-6 illustrate operational waveforms for the system of FIG. 4.

Reference is now made to FIG. 5 which illustrates operational waveforms for the system of FIG. 4 in response to an EFT noise event 40 that occurs during a first polarity phase 160 of the AC drive signal. The excessive charge generated by the EFT noise event 40 is integrated by the sensing circuit 126 and this introduces an error 42 in the C2V Out signal, more specifically an excessive rise in the C2V Out signal. The first comparator 152 senses that the C2V Out signal has risen to exceed the high threshold voltage (ThVh) and the high EFT event detect signal (efth) is asserted 162. The assertion of the high EFT event detect signal (efth) continues until the C2V Out signal voltage falls below the high threshold voltage (ThVh) when the sensing circuit is reset to start the next sensing period S. The digital processing circuit 122 responds to the high EFT event detect signal (efth) by asserting 164 the block accumulation (Ba) signal. Accumulation of the C2V Out signal voltages is blocked (reference 144) for the blocking time duration which includes not only the first polarity phase 160 of the AC drive signal (and its associated sensing period) in which the EFT noise event 40 occurred, but also the immediately succeeding second (opposite) polarity phase 166 of the AC drive signal (and its associated sensing period). The reason for this is that the phase 166 is the opposite of phase 160 and is matching the preceding phase 170 when the last accumulation was performed. Accumulation of the C2V Out signal voltage from this opposite phase 166 would, in and of itself, introduce an error. To avoid introducing this error due to phase, as well as avoid the EFT error 42, accumulation is blocked until the next first polarity phase 168 of the AC drive signal occurs at which point in time the block accumulation signal is deasserted. Accumulation with correct polarity and in the absence of EFT error 42 can then be performed. To account for this blocking time duration, the digital processing circuit 122 will add an additional amount of time 146 to the accumulation time period (i.e., delay the end of the accumulation time period) so as to ensure the correct number of accumulations are performed. The additional amount of time 146 is equal to the length of the two phases during which accumulation was blocked so as to permit two additional sensing periods to be performed and accumulated.

Reference is now once again made to FIG. 4. The detection circuit 150 includes a second comparator (Clow) 154 that includes a first input configured to receive the C2V Out signal from the sensing circuit 126 and a second input configured to receive a low threshold voltage (ThVl). The second comparator 154 functions to compare the voltage of the C2V Out signal to the low threshold voltage and assert a low EFT event detect signal (eftl) when the C2V Out signal is detected to be lower than the low threshold voltage. The digital processing circuit 122 responds by asserting the block accumulation (Ba) signal, and the analog accumulator circuit 128 responds thereto by blocking accumulation of that too low C2V Out signal voltage. Accumulation operations by the accumulator circuit 128 do not continue until the block accumulation (Ba) signal is deasserted by the digital processing circuit 122 following the expiration of the blocking time duration.

Figure 6:
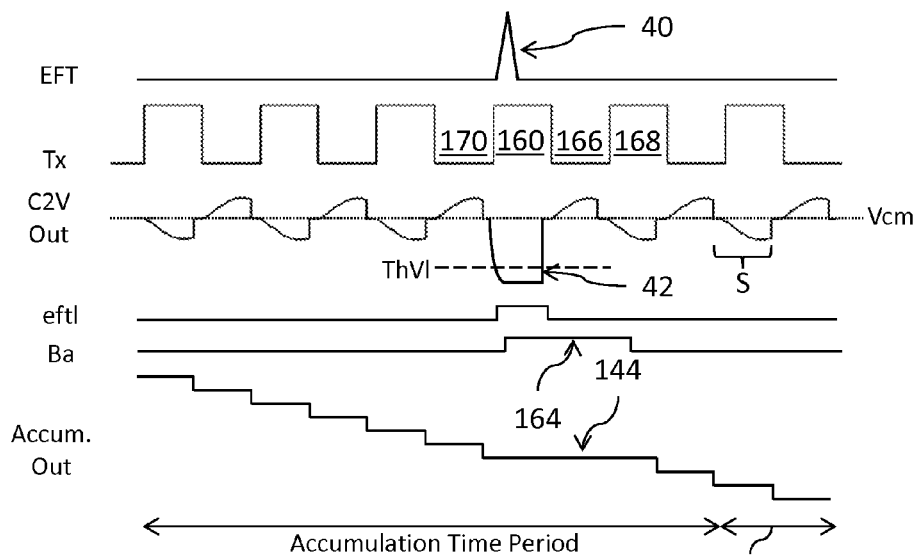

Reference is now made to FIG. 6 which illustrates operational waveforms for the system of FIG. 4 in response to an EFT noise event 40 that occurs during a first polarity phase 160 of the AC drive signal. The excessive charge generated by the EFT noise event 40 is detected by the sensing circuit 126 and this introduces an error 42 in the C2V Out signal, more specifically an excessive fall in the C2V Out signal. The second comparator 154 senses that the C2V Out signal has fallen below the low threshold voltage (ThVl) and the low EFT event detect signal (eftl) is asserted 162. The assertion of the low EFT event detect signal (eftl) continues until the C2V Out signal voltage rises above the low threshold voltage (ThVl) when the sensing circuit is reset to start the next sensing period S. The digital processing circuit 122 responds to the low EFT event detect signal (eftl) by asserting 164 the block accumulation (Ba) signal. Accumulation of the C2V Out signal voltages is blocked (reference 144) for the blocking time duration which includes not only the first polarity phase 160 of the AC drive signal (and its associated sensing period) in which the EFT noise event 40 occurred, but also the immediately succeeding second (opposite) polarity phase 166 of the AC drive signal (and its associated sensing period). The reason for this is that the phase 166 is the opposite of phase 160 and matching the preceding phase 170 when the last accumulation was performed. Accumulation of the C2V Out signal voltage from this opposite phase 166 would, in and of itself, introduce an error. To avoid introducing this error due to phase, as well as avoid the EFT error 42, accumulation is blocked until the next first polarity phase 168 of the AC drive signal occurs at which point in time the block accumulation signal is deasserted. Accumulation with correct polarity and in the absence of EFT error 42 can then be performed. To account for this blocking time duration, the digital processing circuit 122 will add an additional amount of time 146 to the accumulation time period (i.e., delay the end of the accumulation time period) so as to ensure the correct number of accumulations are performed. The additional amount of time 146 is equal to the length of the two phases during which accumulation was blocked so as to permit two additional sensing periods to be performed and accumulated.

The comparators 152 and 154 thus form a window comparator circuit with the window boundary defined by the low and high threshold voltages. The EFT event detect signal 156 is asserted by circuit 150 when the C2V Out signal voltage has a value that is outside of the window boundary (i.e., greater that the high threshold voltage or lower than the low threshold voltage). If the C2V Out signal voltage has a value inside of the window boundary, the EFT event detect signal 156 is deasserted.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A circuit, comprising:
 a charge sensing circuit configured to generate a voltage in a sensing period that is indicative of sensed charge at a selected sense capacitor of a plurality of sense capacitors in a touch panel;
 an accumulator circuit configured to accumulate the voltages for said selected sense capacitor over a plurality of sensing periods;
 a noise detection circuit configured to compare the voltage generated by the charge sensing circuit for said selected sense capacitor in one sensing period to a boundary and generate a noise event detection signal for that selected sense capacitor if the voltage is outside of the boundary; and
 a control circuit configured to receive the noise event detection signal and control the accumulator circuit to block accumulation of the voltage generated by the charge sensing circuit for only that selected sense capacitor of the plurality of sense capacitors during at least the one sensing period in which the noise event detection signal is generated.

2. The circuit of claim 1, wherein said touch panel has a sense line coupled between said selected sense capacitor and to the charge sensing circuit.

3. The circuit of claim 2, wherein the touch panel includes a force line, further comprising a drive circuit coupled to the force line and configured to apply an AC signal, said AC signal having phases corresponding to the sensing periods.

4. The circuit of claim 2, wherein the voltage outside of the boundary is indicative of an occurrence of an electrical fast transient noise event at the touch panel.

5. The circuit of claim 1, wherein the control circuit is further configured to block accumulation of the voltage generated by the charge sensing circuit for only said selected sense capacitor during a further sensing period immediately following the one sensing period in which the noise event detection signal is generated.

6. The circuit of claim 5, further comprising an analog-to-digital converter circuit configured to convert an accumulated output voltage from the accumulator circuit for said selected sense capacitor to a digital value at the end of an accumulation time period that includes said plurality of sensing periods.

7. The circuit of claim 6, wherein the control circuit is further configured to delay the end of the accumulation time period by two additional sensing periods in response to receipt of the noise event detection signal and due to the blocking of accumulation during both the one sensing period in which the noise event detection signal is generated and the further sensing period immediately following the one sensing period in which the noise event detection signal is generated.

8. The circuit of claim 1, wherein the noise detection circuit comprises a window comparator circuit and the boundary is defined by a high voltage threshold and a low voltage threshold.

9. The circuit of claim 1, further comprising an analog-to-digital converter circuit configured to convert an accumulated output voltage from the accumulator circuit for said selected sense capacitor to a digital value at the end of an accumulation time period that includes said plurality of sensing periods.

10. The circuit of claim 9, wherein the control circuit is further configured to delay the end of the accumulation time period by at least one additional sensing period in response to receipt of the noise event detection signal and the blocking of accumulation during the one sensing period in which the noise event detection signal is generated.

11. A method, comprising:
generating a voltage in a sensing period that is indicative of sensed charge at a sense capacitor of a plurality of sense capacitors in a touch panel;
accumulating the voltages over a plurality of said sensing periods for said selected sense capacitor;
detecting when the generated voltage for said selected sense capacitor in one sensing period is outside of a boundary;
generating a noise event detection signal for that selected sense capacitor in response to the detection; and
controlling said accumulating in response to the noise event detection signal by blocking accumulation of the generated voltage for only that selected sense capacitor during at least the one sensing period in which the noise event detection signal is generated.

12. The method of claim 11, wherein the voltage outside of the boundary is indicative of an occurrence of an electrical fast transient noise event at the touch panel.

13. The method of claim 11, wherein controlling said accumulating further comprises blocking to block accumulation of the voltage generated by the charge sensing circuit for said selected sense capacitor during a further sensing period immediately following the one sensing period in which the noise event detection signal is generated.

14. The method of claim 13, further comprising converting an accumulated output voltage for said selected sense capacitor from said accumulating to a digital value at the end of an accumulation time period that includes said plurality of sensing periods.

15. The method of claim 14, further comprising delaying the end of the accumulation time period by two additional sensing periods in response to the noise event detection signal due to blocking accumulation during both the one sensing period in which the noise event detection signal is generated and the further sensing period immediately following the one sensing period in which the noise event detection signal is generated.

16. The method of claim 11, wherein detecting comprises window comparing with the boundary defined by a high voltage threshold and a low voltage threshold.

17. The method of claim 11, further comprising converting an accumulated output voltage for said selected sense capacitor from said accumulating to a digital value at the end of an accumulation time period that includes said plurality of sensing periods.

18. The method of claim 17, further comprising delaying the end of the accumulation time period by at least one additional sensing period in response to receipt of the noise event detection signal and blocking accumulation during the one sensing period in which the noise event detection signal is generated.

19. An apparatus, comprising:
a touch panel including a plurality of force lines and a plurality of sense lines which intersect each other at a plurality of intersection capacitances, said touch panel susceptible to an electrical fast transient noise event;
a charge sensing circuit coupled to one of the plurality of sense lines and configured to generate a voltage in a sensing period that is indicative of sensed charge at a single intersection capacitance;
an accumulator circuit configured to accumulate the voltages for said single intersection capacitance over a plurality of sensing periods;
a noise detection circuit configured to sense the electrical fast transient noise event if the voltage generated by the charge sensing circuit for said single intersection capacitance in one sensing period is outside of a boundary and generate a noise event detection signal; and
a control circuit responsive to the noise event detection signal and configured to control the accumulator circuit to block accumulation of the voltage generated by the charge sensing circuit for only said single intersection capacitance during at least the one sensing period in which the noise event detection signal is generated.

20. The apparatus of claim 19, wherein the control circuit is further configured to block accumulation of the voltage generated by the charge sensing circuit for said single intersection capacitance during a further sensing period immediately following the one sensing period in which the noise event detection signal is generated.

21. The apparatus of claim 20, further comprising an analog-to-digital converter circuit configured to convert an accumulated output voltage for said single intersection capacitance from the accumulator circuit to a digital value at the end of an accumulation time period that includes said plurality of sensing periods.

22. The apparatus of claim 21, wherein the control circuit is further configured to delay the end of the accumulation time period by two additional sensing periods in response to receipt of the noise event detection signal due to the blocking of accumulation during both the one sensing period in which the noise event detection signal is generated and the further sensing period immediately following the one sensing period in which the noise event detection signal is generated.

23. The apparatus of claim 19, further comprising an analog-to-digital converter circuit configured to convert an accumulated output voltage from the accumulator circuit for said single intersection capacitance to a digital value at the end of an accumulation time period that includes said plurality of sensing periods.

24. The apparatus of claim 23, wherein the control circuit is further configured to delay the end of the accumulation time period by at least one additional sensing period in response to receipt of the noise event detection signal and the blocking of accumulation during the one sensing period in which the noise event detection signal is generated.

25. A circuit, comprising:
a charge sensing circuit configured to generate a voltage in a sensing period that is indicative of sensed charge at a selected sense capacitor of a touch panel that includes a plurality of sense capacitors;
a drive circuit configured to apply an AC signal to the touch panel, said AC signal having a first drive phase and a second drive phase;
an accumulator circuit configured to accumulate the voltages for said selected sense capacitor over both the first drive phase and the second drive phase;
a noise detection circuit configured to compare the voltage generated by the charge sensing circuit for said selected sense capacitor in the first drive phase to a boundary and generate a noise event detection signal if the voltage is outside of the boundary; and
a control circuit configured to receive the noise event detection signal and control the accumulator circuit to block accumulation of the voltage generated by the charge sensing circuit for only said selected sense capacitor during the first drive phase and further block accumulation of the voltage generated by the charge sensing circuit for only said selected sense capacitor during the second drive phase immediately following the first drive phase.

26. The circuit of claim 25, wherein the control circuit further configured to control the accumulator circuit to accumulate voltages generated by the charge sensing circuit for only said selected sense capacitor during a further first drive phase and further second drive phase of the AC signal which immediately follow the first and second drive phases during which accumulation was blocked.

* * * * *